United States Patent
Chen et al.

(10) Patent No.: US 8,452,987 B2
(45) Date of Patent: May 28, 2013

(54) METHOD AND SYSTEM FOR DISASTER RECOVERY IN A SECURE REPROGRAMMABLE SYSTEM

(75) Inventors: Xuemin Chen, San Diego, CA (US); Andrew Dellow, Minchinhampton (GB); Iue-Shuenn Chen, San Diego, CA (US); Stephane Rodgers, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 962 days.

(21) Appl. No.: 11/753,474

(22) Filed: May 24, 2007

(65) Prior Publication Data
US 2008/0086657 A1 Apr. 10, 2008

Related U.S. Application Data

(60) Provisional application No. 60/828,556, filed on Oct. 6, 2006.

(51) Int. Cl.
*G06F 11/30* (2006.01)
*G06F 12/14* (2006.01)

(52) U.S. Cl.
USPC ............... 713/193; 714/3; 713/165; 713/194; 726/30

(58) Field of Classification Search
USPC ............ 713/100, 151, 161, 193–194; 726/22, 726/26–30; 380/282; 714/3
See application file for complete search history.

(56) References Cited

U.S. PATENT DOCUMENTS

| | | | |
|---|---|---|---|
| 6,308,265 B1 * | 10/2001 | Miller | 713/2 |
| 6,968,420 B1 * | 11/2005 | Giles et al. | 711/103 |
| 7,008,456 B1 * | 3/2006 | Tanaka et al. | 726/35 |
| 7,404,160 B2 * | 7/2008 | Piper et al. | 716/106 |
| 7,409,435 B1 * | 8/2008 | Bayerl et al. | 709/217 |
| 7,571,329 B2 * | 8/2009 | Brickell et al. | 713/193 |
| 7,752,250 B2 * | 7/2010 | Wait | 708/504 |
| 7,774,323 B2 * | 8/2010 | Helfman | 707/694 |
| 7,774,619 B2 * | 8/2010 | Paaske et al. | 713/191 |
| 7,996,662 B2 * | 8/2011 | Lien et al. | 712/244 |
| 2004/0003265 A1 * | 1/2004 | Freeman et al. | 713/191 |
| 2004/0025011 A1 * | 2/2004 | Azema et al. | 713/156 |
| 2004/0054952 A1 * | 3/2004 | Morrow et al. | 714/742 |

(Continued)

OTHER PUBLICATIONS

Shi Weidong, High Speed Memory Centric Protection on Software Execution, Jul. 23, 2004, Georgia Tech Pubication, vol. 2004, pp. 6-10.*

*Primary Examiner* — Nathan Flynn
*Assistant Examiner* — Viral Lakhia
(74) *Attorney, Agent, or Firm* — Sterne, Kessler, Goldstein & Fox PLLC

(57) ABSTRACT

Methods and systems for software security in a secure communication system are disclosed and may include verifying downloaded code in a reprogrammable system and reloading prestored unmodifiable first stage code upon failure. The prestored unmodifiable first stage code, which may comprise boot code for the reprogrammable system, may be stored in locked flash, and the downloaded software code may be stored in unlocked flash. The downloaded software code may be verified by comparing a signature of the downloaded code to a private key. A first sticky bit may be utilized to indicate a failure of the verification and a second sticky bit may be utilized to indicate passing of the verification and the use of the downloaded software code. Whether to reset the reprogrammable system and reload the prestored unmodifiable first stage code may be determined from within the reprogrammable system, which may comprise a set-top box.

27 Claims, 4 Drawing Sheets

U.S. PATENT DOCUMENTS

| | | | |
|---|---|---|---|
| 2004/0243978 A1* | 12/2004 | Walmsley | 717/120 |
| 2006/0090084 A1* | 4/2006 | Buer | 713/189 |
| 2006/0143600 A1* | 6/2006 | Cottrell et al. | 717/168 |
| 2007/0101416 A1* | 5/2007 | Kim | 726/5 |
| 2007/0106890 A1* | 5/2007 | Kwon | 713/1 |
| 2007/0283140 A1* | 12/2007 | Jones et al. | 713/2 |

* cited by examiner

METHOD AND SYSTEM FOR DISASTER RECOVERY IN A SECURE REPROGRAMMABLE SYSTEM

CROSS-REFERENCE TO RELATED APPLICATIONS/INCORPORATION BY REFERENCE

This application makes reference to, claims priority to, and claims the benefit of U.S. Provisional Application Ser. No. 60/828,556 filed on Oct. 6, 2006.

This application also makes reference to:

U.S. patent application Ser. No. 11/753,338 filed on May 24, 2007; and

U.S. patent application Ser. No. 11/753,414 filed on May 27, 2007.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to software security. More specifically, certain embodiments of the invention relate to a method and system for disaster recovery in a secure reprogrammable system.

BACKGROUND OF THE INVENTION

A typical set-top box is a device that processes analog and/or digital information bearing media content. Set-top boxes (STB) may act as a gateway between a television or PC and a telephone, satellite, terrestrial or cable feed (incoming/outgoing signal.) The STB may receive encoded and/or compressed digital signals from the signal source such as satellite, TV station, cable network, a telephone company, for example, and decodes and/or decompresses those signals, converting them into analog signals displayable on a television. The STB accepts commands from the user (often via use of handheld remote control, keypad, voice recognition unit or keyboard) and transmits these commands back to the network operator.

The implementation of fee-based video broadcasting requires a conventional conditional access (CA) system to prevent non-subscribers and unauthorized users from receiving signal broadcasts. Cryptography algorithms may be utilized, for example, in content protection in digital set-top box systems and in other systems utilized in fee-based video broadcasting. Security keys may, therefore, play a significant part in the encryption and/or decryption process initiated by a cryptography algorithm. For each cryptography algorithm used in a fee-based video broadcasting system, there may be a set of associated security keys that may be needed by the algorithm.

In an increasingly security conscious world, protecting access to information and/or to systems from unwanted discovery and/or corruption is a major issue for both consumers and businesses. Many consumer or business systems may be vulnerable to unwanted access when the level of security provided within the system is not sufficient for providing the appropriate protection. In this regard, consumer systems, such as multimedia systems, for example, may require the use of integrated architectures that enable security management mechanisms for defining and administering user rights or privileges in order to provide the necessary protection from unwanted access. An example of a multimedia system that may be accessed by many different users may be a set-top box where manufacturers, vendors, operators, and/or home users may have an interest in accessing or restricting at least some limited functionality of the system.

The firmware of the security processor used to control the set-top box security functions may require occasional updating. This can pose a problem in instances where an issue occurs during the download, since the software may be critical to the operation of the set-top box. For example, in instances where the software is corrupted during download, the set-top box may be rendered inoperative. As a result, a technician may have to be dispatched to the location of the STB in order to fix the problem. This can be time consuming and costly.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for disaster recovery in a secure reprogrammable system, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for disaster recovery in a secure reprogrammable system. Exemplary aspects of the invention comprise verifying downloaded code in a reprogrammable system and reloading prestored unmodifiable first stage code upon failure of the verification. The prestored unmodifiable first stage code may be stored in locked flash, and the downloaded software code may be stored in unlocked flash. The prestored unmodifiable first stage code may comprise boot code for the reprogrammable system. The downloaded software code may be verified by comparing a signature of the downloaded code to a private key. A first sticky bit may be utilized to indicate a failure of the verification and a second sticky bit may be utilized to indicate passing of the verification and the use of the downloaded software code. Whether to reset the reprogrammable system and reload the prestored unmodifiable first stage code may be determined from within the reprogrammable system, which may comprise a set-top box.

Figure 1A:
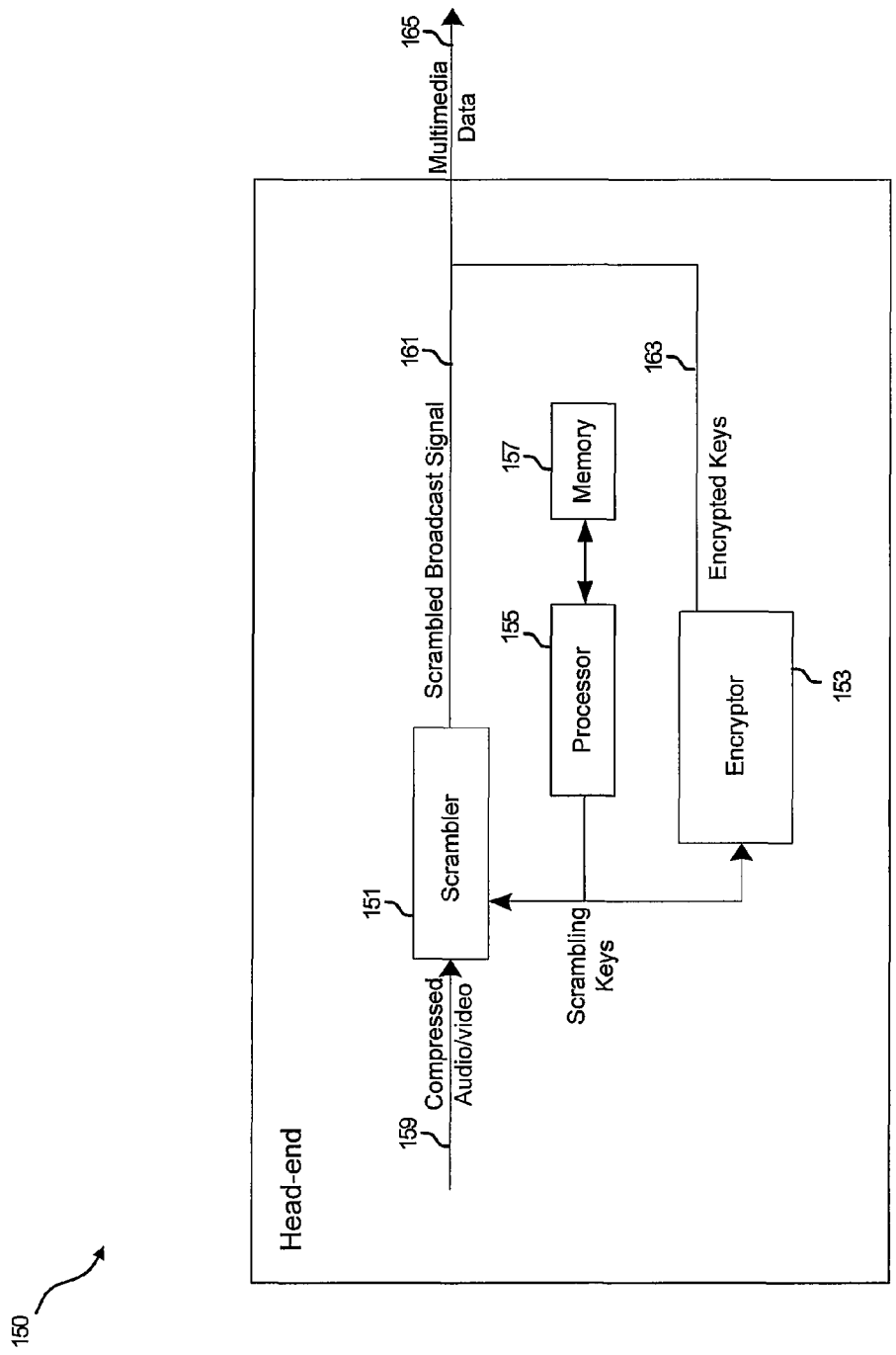
FIG. 1A is a block diagram illustrating an exemplary head-end system, in accordance with an embodiment of the invention.

FIG. 1A is a block diagram illustrating an exemplary head-end system, in accordance with an embodiment of the invention. Referring to FIG. 1, there is shown a block diagram of an exemplary head-end 150 comprising a scrambler 151, an encryptor 153, a processor 155 and a memory 157. There is also shown compressed audio/video 159, a scrambled broadcast signal 161, encrypted keys 163 and a scrambled multimedia signal 165.

The memory 157 may comprise suitable circuitry, logic and/or code that may be enabled to store data that may be utilized by the processor 155 to control the scrambler 151 and the encryptor 153. The data stored on the memory 157 may be utilized by the processor 155 to generate scrambling keys for the scrambler 151 and the encryptor 153.

The scrambler 151 may comprise suitable circuitry, logic and/or code that may be enabled to scramble compressed audio/video 159 utilizing scrambling keys generated by the processor 155 to generate the scrambled broadcast signal 161. The scrambling keys may be unique to a specific end user, or set-top box and may be changed periodically to increase security.

The encryptor 153 may comprise suitable circuitry, logic and/or code that may be enabled to encrypt the scrambling keys to generate the encrypted keys 163. The encrypted keys 163 and the scrambled broadcast signal 161 may comprise the multimedia data 165 communicated to an end user, or set-top box.

The processor 155 may comprise suitable circuitry, logic and/or code that may be enabled to generate scrambling keys that may be utilized by the scrambler 151 and the encryptor 153 to generate a scrambled multimedia signal 165.

In operation, during signal scrambling in the head-end 150, the scrambling keys may determine the scrambling pattern and may be communicated to the scrambler 151 and the encryptor 153 by the processor 155. The scrambler 151 may copy protect scramble or conditional access scramble the compressed audio/video 159. The scrambling key may be changed at fixed intervals of time, such as every few seconds, to maintain a secure system. The scrambling keys may, therefore, be continuously transmitted to the subscriber's receiver, or set-top box 103, as described with respect to FIG. 1B. This may be achieved in the head-end 150 by encrypting the scrambling keys utilizing the encryptor 153 and transmitting them within the scrambled keys 163. The scrambling keys may be unique to a specific set-top box for enhanced security.

In instances where the head-end 150 may be utilized to upload software code to a receiver, such as a set-top box, for example, the processor 155 may communicate the software code to the scrambler 151. The software code may be scrambled by the scrambler 151, which may enhance the security of the downloaded software code. In addition, the communicated software code may include a signature that may be used by the set-top box to verify the received software, and is described further with respect to FIG. 1B.

Figure 1B:
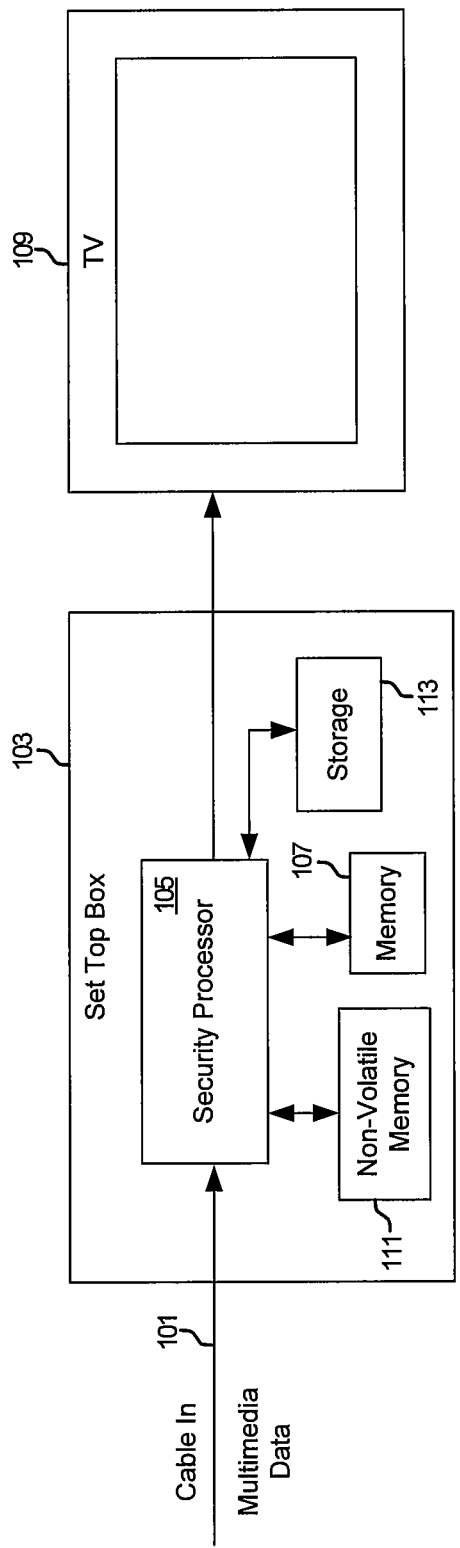
FIG. 1B is a block diagram illustrating an exemplary set-top box with a security processor, in accordance with an embodiment of the invention.

FIG. 1B is a block diagram illustrating an exemplary set-top box with a security processor, in accordance with an embodiment of the invention. Referring to FIG. 1B, there is shown a cable input 101, a television 109 and a set-top box 103 comprising a security processor 105, a memory 107, a non-volatile memory (NVM) 111 and a storage 113.

The cable input 101 may communicate scrambled MPEG-2 multimedia signals, which may be generated by a headend or service provider, and may comprise audio, video, data and/or voice, for example. Although a cable input 101 is shown, the invention is not so limited. Accordingly, other media inputs such as, for example, a satellite feed or a wireless network connection may be provided as an input to the set-top box 103.

The set-top box 103 may comprise suitable circuitry, logic and/or code for receiving multimedia input signals and generating an output signal that may be displayed on the television 109 and/or stored in the storage 113.

The memory 107 may comprise suitable circuitry, logic and/or code that may be enabled to store code for execution by the security processor 105. The memory 107 may comprise read-only memory (ROM) and/or random access memory (RAM).

The NVM 111 may comprise suitable circuitry, logic and/or code that may be enabled to store code for controlling operation of the set-top box 103. The code stored in NVM 111 may be loaded by the security processor 105 and written to the memory 107 for execution by the security processor 105. In this manner, the speed of execution may be faster since the memory 107 may be faster than the NVM 111.

The security processor 105 may comprise suitable circuitry, logic and/or code that may be enabled to receive a scrambled transport stream from, for example, the cable input 101 and descrambling the transport stream for decoding and/or display. The security processor 105 may be enabled to re-scramble the descrambled data for copy protection (CP) prior to storing on the storage 113.

The storage 113 may comprise suitable circuitry, logic and/or code that may be enabled to store multimedia data received by the set-top box 103. The storage 113 may comprise a hard drive or other storage device capable of storing large amounts of multimedia data, for example.

In operation, a multimedia transport stream may be communicated to the set-top box 103 via the cable input 101. In instances where the multimedia transport stream may be scrambled for conditional access and/or copy protection, for example, the security processor 105 may descramble the transport stream before communicating a signal to the television 109 and may CP scramble the descrambled data before storing the data from the descrambled multimedia transport stream in the storage 113. The descrambling keys may be obtained by the set-top box 103 from a separate PID channel in the transport stream, via an entitlement control message (ECM). Following descrambling, the security processor 105 may re-scramble the data before storing the data from the descrambled multimedia transport stream in the storage 113.

The set-top box 103 may comprise various exemplary functions such as a scrambling/descrambling function, an entitlement control function, and an entitlement management function. The scrambling/descrambling function may be designed to make the program incomprehensible to unauthorized receivers. Scrambling may be applied commonly or separately to the different elementary stream components of a program. For example, the video, audio and data stream components of a TV program may be scrambled in order to make these streams unintelligible. Scrambling may be achieved by applying various scrambling algorithms to the stream components. The scrambling algorithm usually utilizes a descrambling key. Once the signal is received, the descrambling may be achieved by any receiver that holds the descrambling key used by the scrambling algorithm prior to transmission. Scrambling and descrambling operations, in general, may not cause any impairment in the quality of the signals.

The descrambling key used by the scrambling algorithm is a secret parameter known only by the scrambler and the authorized descrambler or descramblers. In order to preserve the integrity of the encryption process, the control word may be changed frequently in order to avoid any exhaustive searches by an unauthorized user, which may be intended to discover the descrambling key.

The set-top box 103 may be enabled to scramble and/or randomize transmitted data bits so that unauthorized decoders may not decode the transmitted data bits. In addition to scrambling, a key may also be transformed into an encrypted key in order to protect it from any unauthorized users. In various embodiments of the invention, the CA system descrambling/scrambling system 100 may be enabled to utilize key encryption, and the encrypted keys may be securely distributed.

The set-top box 103 may be enabled to provide protection against signal piracy, efficient scrambling, flexibility, support for a variety of formats, and ease of implementation.

For CA or CP, private (secure) keys may be used for scrambling and descrambling high-value content or for protecting highly sensitive transactions. In a CA system, the content scrambling key may be protected. To ensure proper functionality, the CA system may perform scrambling according to the properties of the data for transmission. In addition, the CA system may be enabled to change the key regularly to maintain the security of the scrambling system, and transmit the key information to the receiver in a secure manner using, for example, a hierarchical encryption system.

The software code utilized to control the operation of the set-top box 103 may be modified or updated periodically by a trusted source such as a service provider, for example. The software code may be downloaded from a service provider head-end via the cable input 101. Difficulties may arise in this software code download in instances where a power outage or other disruption occurs while downloading and storing to the non-volatile memory 111. Another issue may arise from unauthorized users, or hackers, attempting to rewrite the software code to obtain access to the set-top box 103. In accordance with an embodiment of the invention, the aforementioned issues may be mitigated by utilizing a two-stage download and secure, or locked, storage of at least a portion of the software code in the NVM 111, described further with respect to FIG. 2.

Figure 2:
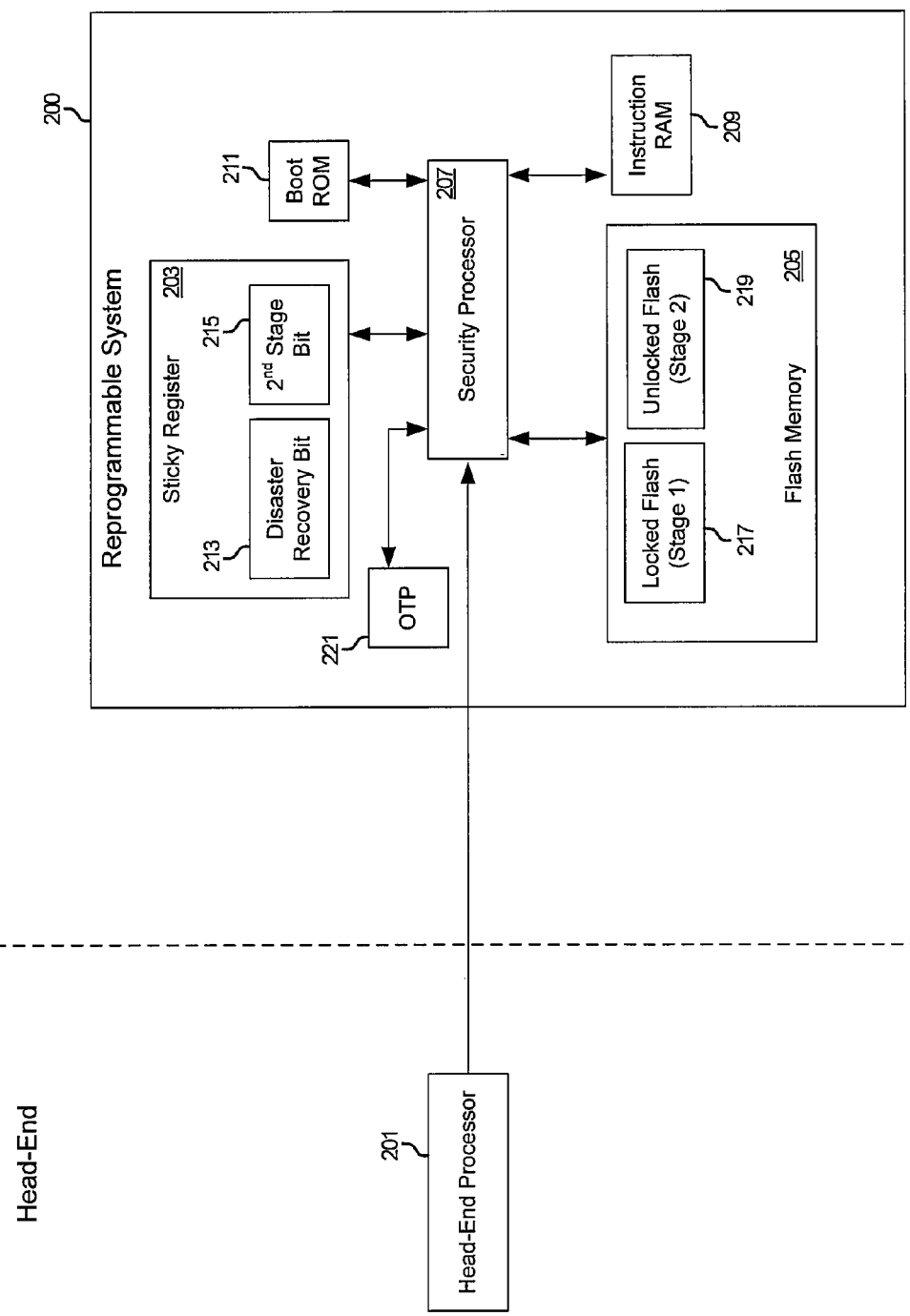
FIG. 2 is a block diagram illustrating an exemplary two-stage disaster recovery system, in accordance with an embodiment of the invention.

FIG. 2 is a block diagram illustrating an exemplary two-stage disaster recovery system, in accordance with an embodiment of the invention. Referring to FIG. 2, there is shown a head-end processor 201 and a reprogrammable system 200 comprising a sticky register 203, a flash memory 205, a security processor 207, an instruction RAM 209, a boot ROM 211 and a one time programmable (OTP) memory 221.

The head-end processor 201 may comprise suitable circuitry, logic and/or code that may be enabled to communicate signals to the security processor 207. The communicated signals may comprise scrambled multimedia data, encrypted scrambling keys and/or signed software code, for example.

The security processor 207 may comprise suitable circuitry, logic and/or code that may be enabled to control operations of the reprogrammable system 200. The security processor 207 may be substantially similar to the security processor 105, described with respect to FIG. 1B. The number of components controlled by the security processor 207 is not limited to the components shown in FIG. 2. Accordingly, a plurality of components and functions may not be shown or described here that are not specific to disaster recovery in accordance with an embodiment of the invention.

The flash memory 205 may comprise suitable circuitry, logic and/or code that may be enabled to store code that may be downloaded from the head-end processor 201 by the security processor 207. The flash memory 205 may comprise a locked flash 217 and an unlocked flash 219. The locked flash 217 may comprise a portion of the flash memory 205 and may be enabled to store a first stage, stage 1, of software code utilized by the security processor 207. The unlocked flash 219 may be a portion of the flash memory 205, and may store data that may be downloaded to the reprogrammable system 200. The downloaded code may comprise boot code and other code utilized for the operation of the reprogrammable system 200, and may comprise updated versions to be used in place of the $1^{st}$ stage code.

The sticky register 203 may comprise suitable circuitry, logic and/or code that may be enabled to store data that may not be lost on a system reset of the reprogrammable system 200, such as when the security processor 207 is rebooted, for example. The sticky register 203 may comprise a disaster recovery bit 213 and a $2^{nd}$ stage bit 215. The disaster recovery bit 213 may be enabled to indicate to the security processor 207 that a problem with the $2^{nd}$ stage code may have occurred, either through an error in the download process, or a glitch in the reprogrammable system 200 that may have corrupted the data, and appropriate recovery steps may need to be taken. The $2^{nd}$ stage bit 215 may be enabled to indicate that the security processor 207 may be reading from and/or executing code loaded from the unlocked flash 219 into the instruction RAM 209. This code may comprise the $2^{nd}$ stage code, which may be downloaded to the reprogrammable system 200. In another embodiment of the invention, the sticky register 203 may be within the flash memory 205.

The boot ROM 211 may comprise suitable circuitry, logic and/or code that may be enabled to communicate stored data to the security processor 207. The data stored on the boot ROM 211 may comprise boot code, for example, for the security processor 207. The boot code stored on the boot ROM 211 may comprise operating instructions for the security processor 207 during reboot and/or startup.

The instruction RAM 209 may comprise suitable circuitry, logic and/or code that may be enabled to store data from, and communicate stored data to, the security processor 207. The data stored on the instruction RAM 209 may comprise operating instructions for the security processor 207.

The OTP memory 221 may comprise suitable circuitry, logic and/or code that may be enabled to store a secure hashing algorithm digest of the $1^{st}$ stage code. The data stored in the OTP memory 221 may be programmed once, and may not be reprogrammed.

In operation, the software code may be stored in the reprogrammable system 200 in two stages. The first stage may be stored in the locked flash 217 at the time of manufacture and may be intended to be a secure and fail-safe version of software to allow operation of the reprogrammable system 200 in cases of corruption of the $2^{nd}$ stage code. The SHA digest of the $1^{st}$ stage code may be stored in the OTP memory 221, which may comprise a secure storage since it may not be modified, unlike a signature which may always be vulnerable to a hacker discovering the private key. In this manner, the $1^{st}$ stage code may be verified by performing a secure hashing algorithm on the $1^{st}$ stage code and comparing the result to the data stored in the OTP 221. The $1^{st}$ stage code stored in the locked flash 217 may not be modified.

The 2nd stage code may be required to be modified since it may need to be updated occasionally. Accordingly, it may not be stored in locked flash, and may utilize a signature for verification. The signature associated with the signed software code may correspond to a private key. Since the security processor may be responsible for booting the reprogrammable system 200, in instances where there is a glitch in the security processor code, the reprogrammable system 200 may become unusable. In a conventional system, if the boot code may be corrupted, a processor may not be able to boot the set-top box, which may require a technician to perform a service call.

In instances where the software code may be corrupted, due to an interruption in a download or from voltage glitches in the reprogrammable system 200, for example, the software code may fail a signature check when retrieved from the unlocked flash 219. The first stage code may not be susceptible to corruption since it may be stored in the locked flash 217, which may be unaffected by voltage glitches in the reprogrammable system 200.

In instances where the signature check of the $2^{nd}$ stage code may fail, the disaster recovery bit 213 may be set in the sticky register 203, and the $2^{nd}$ stage bit 215 may be cleared, indicating that the $2^{nd}$ stage code may be corrupted and the $1^{st}$ stage code may need to be reloaded. The security processor 207 may vector back to the beginning of the boot ROM 211 and re-load the hashed code back from the locked flash 217 into the instruction RAM 209 over the corrupted $2^{nd}$ stage code. In instances where the disaster recovery bit 213 is set, the security processor 207 may be forbidden from reloading the corrupted code in the unlocked flash 219 and may be required to initiate a complete code download from the head-end or appropriate service provider followed by a reprogrammable system 200 reset. Thus, the head end may attempt to re-download the 2nd stage code and repair the problem remotely.

In another embodiment of the invention, in instances where the disaster recovery bit 213 is set, the operation of the reprogrammable system 200 may be restricted, depending on the security policy of the service provider. In this manner, the decision to re-download software may be entirely within the reprogrammable system 200, significantly improving the security of the system.

The software code may be re-downloaded and stored in the unlocked flash 219 of the flash memory 205, as described previously. If the download occurred without issue, the signature check may then pass, and the $2^{nd}$ stage code may then be executed by the security processor 207.

Figure 3:
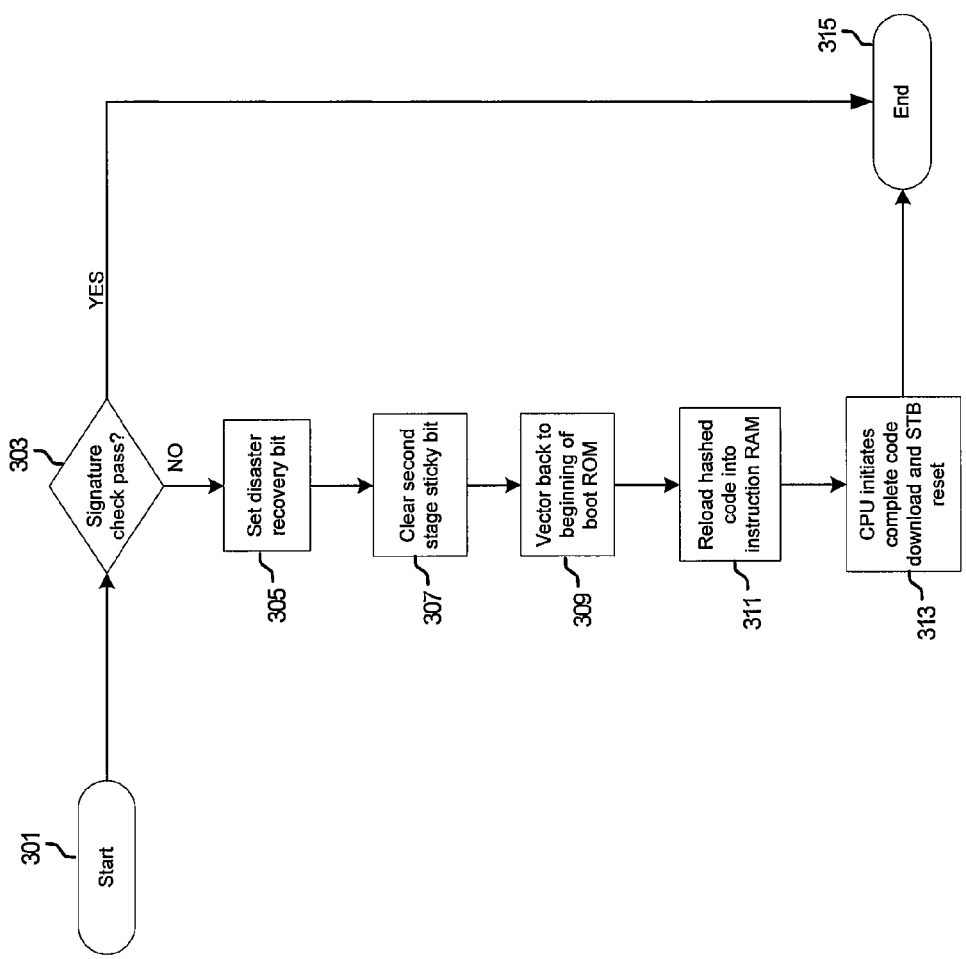
FIG. 3 is a flowchart illustrating exemplary steps for disaster recovery in a secure reprogrammable system, in accordance with an embodiment of the invention.

FIG. 3 is a flowchart illustrating exemplary steps for disaster recovery in a secure reprogrammable system, in accordance with an embodiment of the invention. In step 303, following start step 301, the signature of the $2^{nd}$ stage code stored in the unlocked flash 219 is checked. If the signature check passes, the process may proceed to end stop 315. If the signature check fails, the process may then proceed to step 305 where the disaster recovery bit 213 may be set. In step 307, the $2^{nd}$ stage bit 215 may be cleared, and in step 309 the process may vector back to the beginning of the boot ROM 211. In step 311, the hashed code may be reloaded into the instruction RAM 209. In step 313, the security processor 207 may initiate a complete code download and then reset the reprogrammable system, such as the set-top box 103, before proceeding to end step 315.

In accordance with an embodiment of the invention, a disaster recovery bit 213 may be added to a sticky register 203. The bits in a sticky register may be modified by software, for example. The bits in a sticky register may not be set or cleared by a hot reset. The disaster recovery bit 213 may not be cleared on a reset of the reprogrammable system 200. The boot ROM firmware and the security processor 207 that loads the $2^{nd}$ stage downloaded code may determine whether the downloaded code passes the signature check. In instances where the $2^{nd}$ stage downloaded code fails the signature check, the disaster recovery bit 213 in the sticky register 203 may be set. The $2^{nd}$ stage bit 215 may indicate the second stage of downloaded code may be cleared. Control may vector back to the beginning of the boot ROM 211. The hashed code may be reloaded into the instruction RAM 209. When the security processor 207 reboots, it may determine whether the disaster recovery bit 213 is set. In instances where the disaster recovery status bit may be set, the security processor 207 may be prevented from attempting to download code. The security processor 207 may then initiate a complete code download followed by a reset of the reprogrammable system 200, or restrict the reprogrammable system 200 operation based on the prevailing security policy. The hashed code may not be corrupted as it may be stored in the locked flash memory, unlike the second stage downloaded code.

In an embodiment of the invention, a method and system are disclosed for verifying downloaded software code in a reprogrammable system 200 and reloading prestored unmodifiable first stage code. The prestored unmodifiable first stage code may be stored in locked flash 217, and the downloaded software code may be stored in unlocked flash 219 in flash memory 205. The prestored unmodifiable first stage code may comprise boot code for the reprogrammable system 200. The downloaded software code may be verified by comparing a signature of the downloaded code to a private key. A first sticky bit 213 may be utilized to indicate a failure of the verification and a second sticky bit 215 may be utilized to indicate passing of the verification and the use of the downloaded software code. Whether to reset and reload the prestored unmodifiable first stage code may be determined from within the reprogrammable system 200, which may comprise a set-top box 103.

Certain embodiments of the invention may comprise a machine-readable storage having stored thereon, a computer program having at least one code section for communicating information within a network, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for software security in a secure communication system, the method comprising:
    performing by a reprogrammable system within said secure communication system:
        during reprogramming or subsequent to said reprogramming, verifying software code downloaded to said reprogrammable system,
        wherein, if said verifying said downloaded software code is successful:
            executing said downloaded software code within said reprogrammable system and storing said downloaded software code within an unlocked portion of a memory within said reprogrammable system for future use, and
        wherein, if said verifying said downloaded software code fails:
            prohibiting downloading and/or clearing of said downloaded software code stored within said unlocked portion of said memory within said reprogrammable system,
            reloading prestored unmodifiable operating code from a locked portion of said memory to said reprogrammable system for execution, and
            verifying said prestored unmodifiable operating code by performing a secure hashing algorithm on said prestored unmodifiable operating code and comparing a result of said secure hashing algorithm with a stored value in a one-time programmable (OTP) memory.

2. The method according to claim 1, wherein said prestored unmodifiable operating code comprises boot code for said reprogrammable system.

3. The method according to claim 1, wherein said memory comprises a flash memory.

4. The method according to claim 1, further comprising: generating a sticky bit to indicate a failure of said verifying.

5. The method according to claim 1, further comprising: generating a sticky bit to indicate passing of said verifying and use of said downloaded software code.

6. The method according to claim 1, further comprising: determining, from within said reprogrammable system, whether to reset said reprogrammable system and reload said prestored unmodifiable operating code.

7. The method according to claim 1, further comprising: verifying said downloaded code by comparing a signature of said downloaded code to a private key.

8. The method according to claim 1, wherein said reprogrammable system is a set-top box.

9. A system for software security in a secure communication system, the system comprising:
    one or more circuits in a reprogrammable system that during reprogramming or subsequent to said reprogramming are configured to verify software code downloaded to said reprogrammable system,
        wherein, if said verification of said downloaded software code is successful:
            said one or more circuits are configured to execute said downloaded software code within said reprogrammable system and stores said downloaded software code within an unlocked portion of a memory within said reprogrammable system for future use, and
        wherein, if said verification of said downloaded software code fails:
            said one or more circuits are configured to prohibit downloading and/or clearing of said downloaded software code stored within said unlocked portion of said memory within said reprogrammable system,
            said one or more circuits are configured to reload prestored unmodifiable operating code from a locked portion of said memory to said reprogrammable system for execution, and
            said one or more circuits are configured to verify said prestored unmodifiable operating code by performing a secure hashing algorithm on said prestored unmodifiable operating code and comparing a result of said secure hashing algorithm with a stored value in a one-time programmable (OTP) memory.

10. The system according to claim 9, wherein said memory comprises a flash memory.

11. The system according to claim 9, wherein said one or more circuits are configured to enable determining, from within said reprogrammable system, whether to reset said reprogrammable system and reload said prestored unmodifiable code.

12. The system according to claim 9, wherein said one or more circuits are configured to enable verification of said downloaded code by comparing a signature of said downloaded code to a private key.

13. The system according to claim 9, wherein said reprogrammable system is a set-top box.

14. The system of claim 9, wherein said one or more circuits comprise a sticky register, and wherein said sticky register comprises a disaster recovery bit and a downloaded software code bit.

15. The system of claim 14, wherein said disaster recovery bit indicates that a potential error associated with said downloaded code has occurred.

16. The system of claim 14, wherein said downloaded software code bit indicates that code is being read from said unlocked portion of said memory.

17. The system of claim 14, wherein said one or more circuits are further configured to determine whether said disaster recovery bit has been reset after a reboot of said system.

18. The system of claim 14, wherein said one or more circuits are further configured to enable said disaster recovery bit in response to a determination that said downloaded code has failed a signature check.

19. The system of claim 18, wherein said one or more circuits are further configured to determine that said verification has failed in response to determining that said disaster recovery bit has been set.

20. A non-transitory machine-readable storage, having stored thereon a computer program having at least one code section for software security in a secure communication system, said at least one code section being executable by a machine, and said at least one code section configured to instruct said machine to perform operations comprising:

during reprogramming or subsequent to said reprogramming, verifying software code downloaded to said reprogrammable system, wherein, if said verifying said downloaded software code is successful:

executing said downloaded software code within said reprogrammable system and storing said downloaded software code within an unlocked portion of a memory within said reprogrammable system for future use, and wherein, if said verifying said downloaded software code fails:

prohibiting downloading and/or clearing of said downloaded software code stored within said unlocked portion of said memory within said reprogrammable system, reloading prestored unmodifiable operating code from a locked portion of said memory to said reprogrammable system for execution, wherein said prestored unmodifiable operating code utilizes a secure hashing algorithm, and verifying said prestored unmodifiable operating code by performing a secure hashing algorithm on said prestored unmodifiable operating code and comparing a result of said secure hashing algorithm with a stored value in a one-time programmable (OTP) memory.

21. The non-transitory machine-readable storage according to claim 20, wherein said prestored unmodifiable operating code comprises boot code for said reprogrammable system.

22. The non-transitory machine-readable storage according to claim 20, wherein said memory comprises a flash memory.

23. The non-transitory machine-readable storage according to claim 20, wherein said at least one code section comprises code for generating a sticky bit to indicate a failure of said verifying.

24. The non-transitory machine-readable storage according to claim 20, wherein said at least one code section comprises code for generating a sticky bit to indicate passing of said verifying and use of said downloaded software code.

25. The non-transitory machine-readable storage according to claim 20, wherein said at least one code section comprises code for determining from within said reprogrammable system, whether to reset said reprogrammable system and reload said prestored unmodifiable code.

26. The non-transitory machine-readable storage according to claim 20, wherein said at least one code section comprises code for verifying said downloaded code by comparing a signature of said downloaded code to a private key.

27. The non-transitory machine-readable storage according to claim 20, wherein said reprogrammable system is a set-top box.

* * * * *